Figure 1:
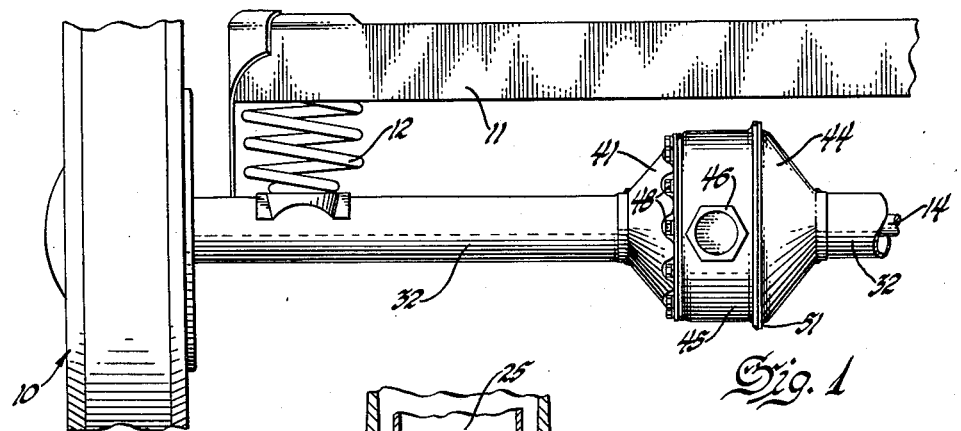

April 10, 1951  B. GRIFFITH  2,548,258
DRIVE AXLE

Filed April 12, 1949  4 Sheets-Sheet 1

Inventor
Bain Griffith
By Saucer, Willits, Helwig & Baillio
Attorneys

April 10, 1951 B. GRIFFITH 2,548,258
DRIVE AXLE

Filed April 12, 1949 4 Sheets-Sheet 3

Inventor
Bain Griffith
By
Spencer Whillito, Helwig & Baillio
Attorneys

April 10, 1951     B. GRIFFITH     2,548,258
DRIVE AXLE
Filed April 12, 1949     4 Sheets-Sheet 4
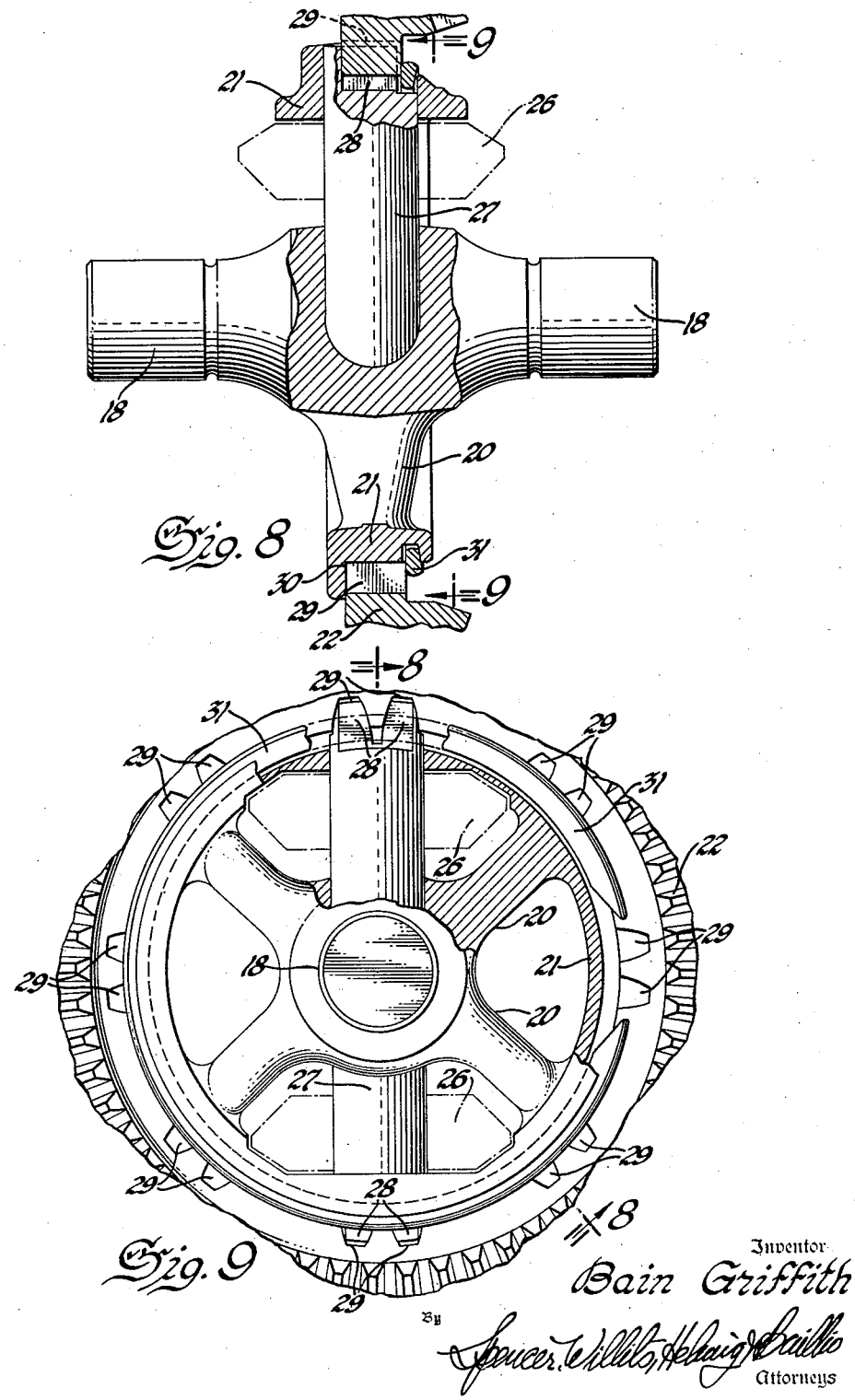

UNITED STATES PATENT OFFICE 2,548,258

DRIVE AXLE

Bain Griffith, Detroit, Mich., assignor to General Motors Corporation, Detroit, Mich., a corporation of Delaware Application April 12, 1949, Serial No. 87,002

13 Claims. (Cl. 74—713)

This invention relates to drive axles for motor vehicles. More particularly it deals with an improved assembly of generally conventional drive axle parts which have been simplified in design so that they can be made and assembled into a compact unit at low cost with reduction in material and unsprung weight. The parts are so formed and arranged for cooperation with one another to afford especial strength and sturdiness and to give trouble free operation over a long period of use.

It is an object of the invention to provide a drive axle which is made up readily and economically without heavy investment in factory floor space and complex equipment and without an unduly large expenditure for technically skilled man power. Extensive machining operations have been eliminated wherever possible, especially with a view of avoiding weakening of the parts incident to the removal of metal, including the drilling and tapping of numerous bolt receiving and fastening openings and instead the parts have been designed so that they can be easily and compactly fitted and joined and quickly located in proper operative relation in which the load is effectively transmitted and carried in a manner to keep down wear.

A further object of the invention is to have the operating parts supported by husky bearings in the axle housing, which in the regions of the bearings is designed for utmost strength and to enable the main driving and driven gear elements to be held in proper mesh and adjusted by a simple selective shim expedient.

Another object is to provide an improved mounting of the gears for better transmission of the drive from the ring gear and through the differential gearing with ample resistance to ring gear thrust. Instead of the usual expedient of a heavy ring gear carrier or cage directly mounted in the axle housing on thrust bearings it is proposed to do away with the multiple bolting of the ring gear to the cage and the bulkiness required for a heavy cage and bolted fastenings capable of transmitting the drive load and to substitute a much lighter ring gear carrier which is freed from the drive forces and has a shouldered rim on which the ring gear is sleeved and retained by an easily and quickly applied split snap ring with the ring gear keyed to a diametrically disposed pin on which the differential gears are mounted for direct drive from the ring gear and with the ring gear carrier piloted internally of tubular hubs of the differential side gears and which hubs in turn are rotatably mounted in the axle housing and have splined drive relation with the inner ends of the axle shafts.

A further object is to provide in cooperation with the bearings for the drive gearing a simplified type of shimming arrangement for insuring proper mesh engagement of the drive pinion and ring gear and which in the case of the ring gear shims also maintains proper relation of the parts for transmitting ring gear thrust into the support bearings in the housing with spring take up means to keep down wear and looseness in the bearings and associated parts.

A still further object is to provide abundant ruggedness adjacent the load bearings for the differential and drive axle supporting and enclosing housing structure and to provide a housing design utilizing easily formed lightweight sheet metal. To that end the axle housing comprises sheet metal tubing for its two transverse arms and sheet metal pressings joining together the adjacent inner ends of the tubing and affording an enlarged central chamber for the differential mechanism as well as a laterally projecting arm or tubular support for the drive pinion shaft. The inner end of each axle tube in the region of the differential support bearing is stiffened by a surrounding bulkhead or plate disk welded thereto and by a frusto-conical stiffener collar peripherally welded to the rim of the bulkhead and centrally welded to the tube in axially outwardly spaced relation to the tube inner end. The bulkhead and stiffener pressings combine to serve additionally as side closures for a centrally disposed and enlarged cylinder enclosing the differential mechanism with one set of pressings being permanently joined by peripheral welding to the neighboring end of the cylinder to form therewith a unitary subassembly and the other set of pressings being detachably joined and peripherally bolted to and closing the other side of the cylinder so that a separable two-part axle housing is afforded. Both the central cylinder and the stiffener pressing permanently joined thereto are further formed with forwardly projecting parti-tubular or half cylindrical portions which are welded together along their mating edges and have fitted therein a bearing supporting cylinder for the drive pinion shaft.

Figure 2:
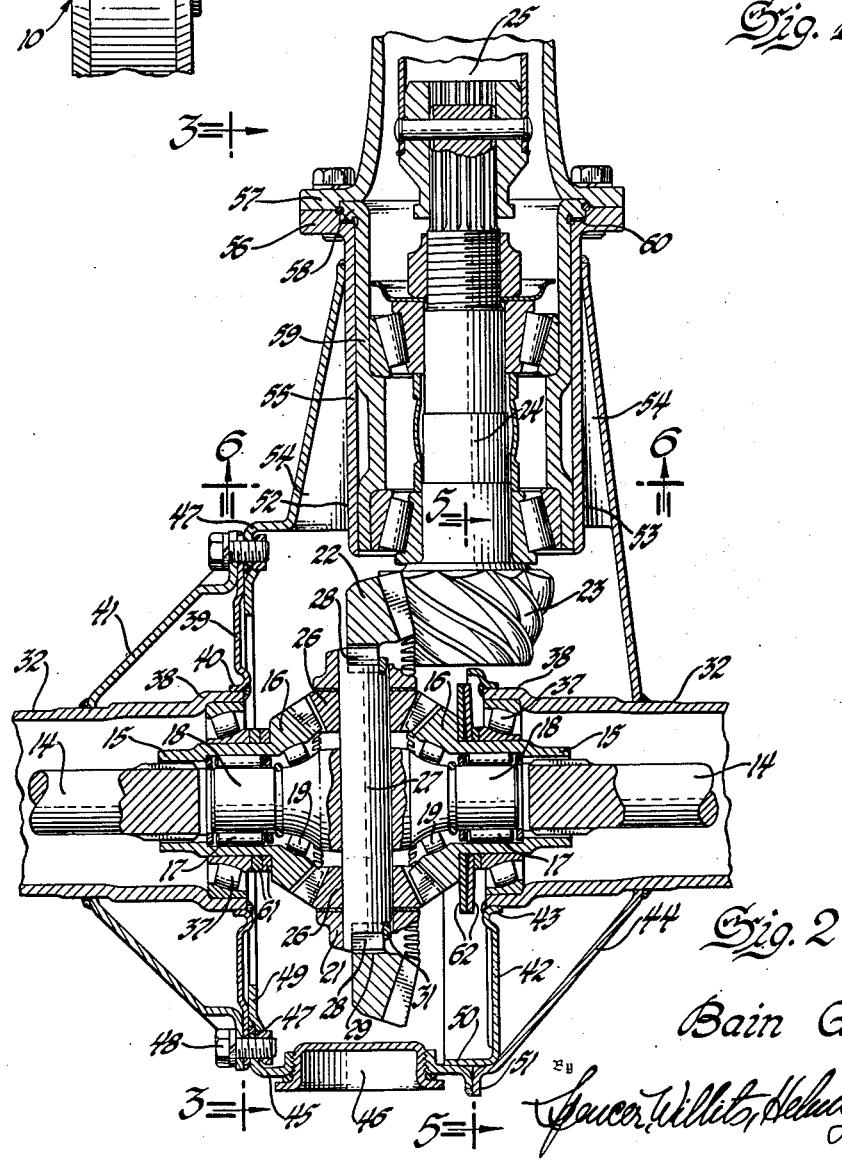
Figure 3:
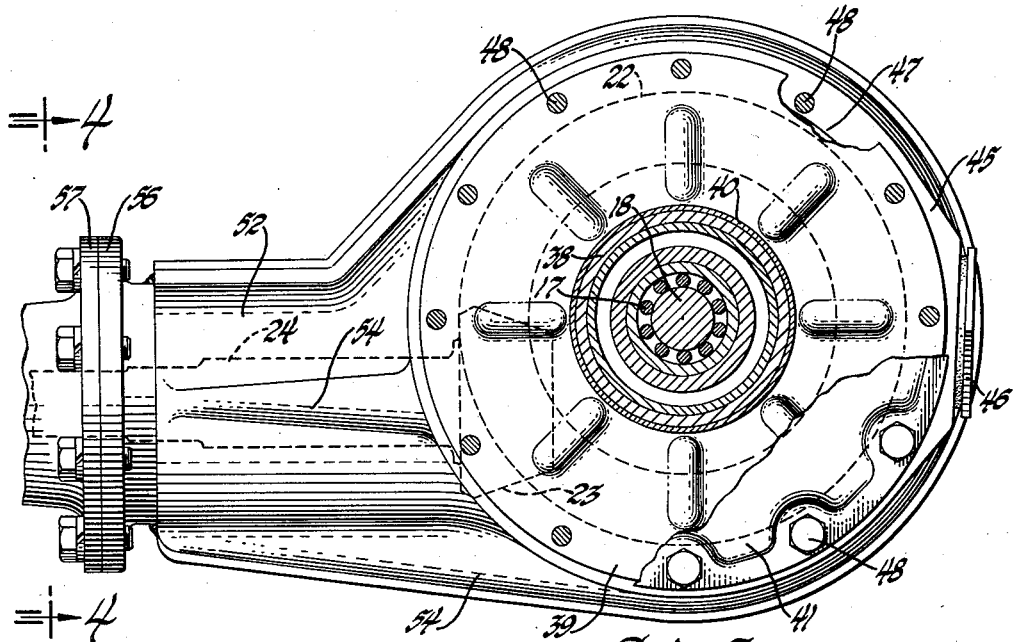
Figure 4:
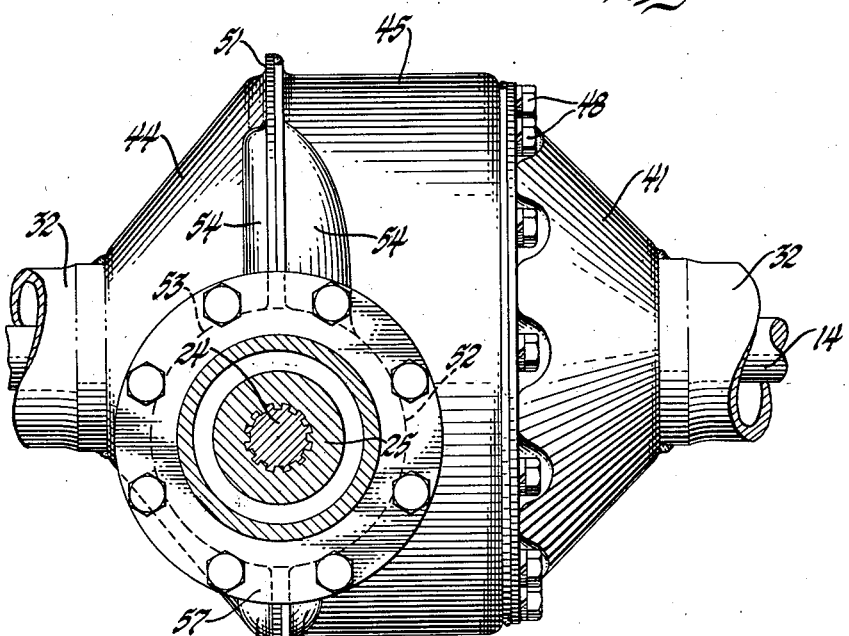
Figure 5:
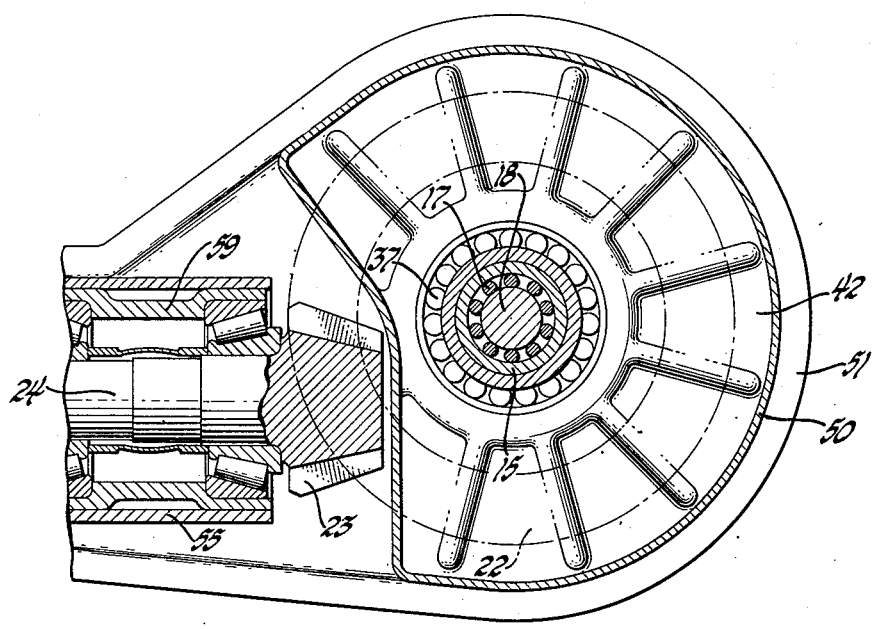
Figure 6:
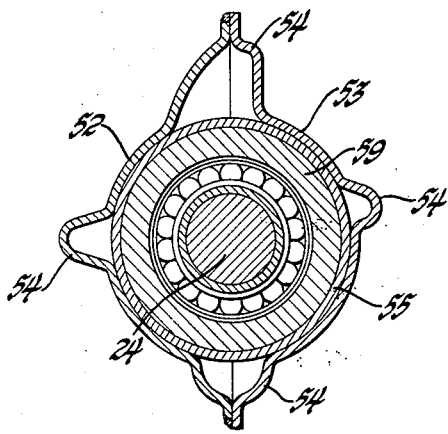
Figure 7:
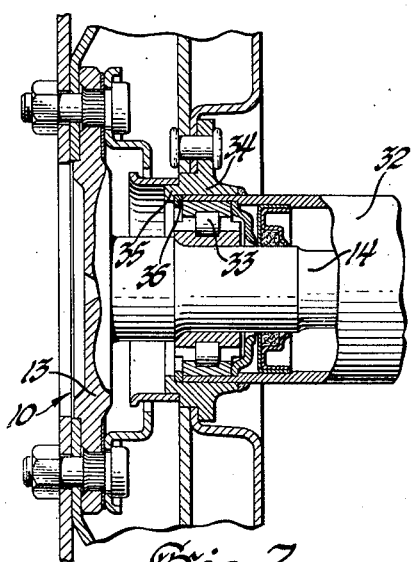

Additional objects and advantages of the invention will become apparent during the course of the following description having reference to the accompanying drawings wherein Figure 1 is an elevation viewed from the rear of a motor vehicle to illustrate the installation of the drive axle; Figure 2 is a horizontal sectional view through the central portion of the complete axle assembly and shows the relation of the drive gearing; Figure 3 is an elevation partly broken away and in section as on line 3—3 of Figure 2; Figure 4 is a view partly in elevation and partly in section as on line 4—4 of Figure 3; Figures 5 and 6 are sections taken respectively on line 5—5 and 6—6 of Figure 2; Figure 7 is a vertical section at the end of one of the tubular axle arms; Figure 8 is a sectional view of the differential and ring gear carrier as on line 8—8 of Figure 9 and Figure 9 is an elevation viewed in the direction of the arrows on line 9—9 of Figure 8 with parts broken away and in section.

The conventional motor vehicle has a chassis frame supporting an internal combustion engine at the front and being flexibly mounted at the rear through leaf or coil springs upon the drive axle housing with road wheels rotatably mounted at opposite ends of the housing. In Figure 1 a road wheel is indicated at 10 and close to the wheel the axle assembly suspends the chassis frame 11 through a spring, conveniently illustrated as a helical coil 12. Each wheel 10, as seen in Figure 7, is detachably bolted to a mounting flange 13 formed on the outer end of each axle shaft 14—14. The two axle shafts axially aligned in end to end relation have their inner ends in splined drive connection with the hubs or sleeve projections 15—15 of the beveled side gears 16—16 forming part of the differential mechanism. Also mounted within the gear hubs 15—15 for differential rotation by means of roller bearings 17 are the pilot stubs 18 of a ring gear carrier. In addition to the radial load bearings 17 outward thrust roller bearings 19 are interposed between the side gears and the pilot stubs 18.

The differential carrier is in the nature of a spider having spaced spokes 20 joining its supporting pilot stubs 18 with an annular rim 21 on which is mounted the ring gear 22 having bevel teeth on one side face to mesh with a bevel pinion 23 on the rear end of a forwardly projecting shaft 24 to be joined by a propeller drive shaft 25 with the engine or vehicle power plant. Within diametrically opposite spaces between the spokes 20 are located a pair of differential bevel gears 26 in mesh with the side gears 16 and through which differential drive is transmitted from the ring gear to the axle shafts. These differential gears 26 are rotatably mounted on a pin 27 extending diametrically across and through aligned openings in the spider and terminating beyond the periphery of the rim 21 in keying formations conveniently in a form resembling a pair of gear teeth 28 and which enter correspondingly shaped slots 29 in the inner surface of the ring gear. By this expedient the spider or ring gear carrier is relieved from all drive transmitting strain and can be a relatively inexpensive lightweight forging or casting, the drive being transmitted direct from the ring gear to the differential gears through the pin 27.

From inspection of Figure 9 it will be noted that the ring gear has a series of circumferentially spaced sets of pin terminal key receiving slots 29 arranged in diametrically opposite pairs but that only two sets of the internal formations are utilized in the assembly. While any two sets may be used selectively the primary reason for the inclusion of the group is to obtain better accuracy in manufacture and to distribute stresses during heat treatment which otherwise might cause ring warpage and an out of round condition with the burden of either scrappage or expensive salvage re-machining operations.

The direct drive connection between the ring gear and the differential gear mounting pin enables further simplification and weight reduction by the elimination of the customary bolt connections between the ring gear and its carrier together with the need for drilling and tapping holes in these parts which results either in structural weakness or in considerable bulkiness to make up for such weakening. Thus the rim 21 of the spider is formed with a small radial projection or annular abutment shoulder 30 on one side for engagement with the ring gear base opposite that containing the bevel teeth so as to resist lateral gear tooth drive thrust and is further provided in axially spaced relation to the abutment shoulder 30 and at a distance therefrom corresponding to the width of the inner portion of the ring gear with an annular groove for the reception of a spring snap ring retainer 31 which projects above the periphery of the rim and engages with the ring gear. The retainer 31 is a split ring which can be expanded but which in its normally contracted condition is of smaller internal diameter than the outside diameter of the rim so that it has a natural tendency to remain within its seating groove. This snap ring retainer engages the face of the ring gear containing the driving teeth and the retainer ring therefore is not subject to lateral gear thrust load. It will be apparent that the assembly and disassembly of the differential subassembly can be easily and quickly accomplished with the assembly involving only the operations of placing the differential gears 26 within the spider and pushing the pin 27 radially through the spider and the gears and then slipping the ring gear 22 axially on the spider rim and into keying relation with the pin end formations followed by the application of the snap ring for securely locking the parts. Reversal of the procedure is followed for disassembly.

It is customary to mount the engine in the chassis frame so that the engine crankshaft is on the longitudinal center line of the vehicle with the transmission or gearbox output shaft and the drive propeller shaft in axial alignment with the engine crankshaft. Thus with the pinion drive shaft 24 having its center line coincident with the vehicle center line necessitates that the differential mechanism be offset to one side so that the left-hand axle shaft 14 is somewhat shorter than the right-hand axle shaft 14. Similarly the axle housing arms are of different length. It is here proposed that the arms be formed from readily available and low cost conventional tubing which can be cut into sections of the desired length as called for for use either as right or left-hand arms and depending upon the predetermined width of the wheel tread. The diameter of the tubing will be selected largely in relation to the wheel bearings at opposite ends of each tube and the only manufacturing operations necessary will be such as to form locating shoulders for the outer races of the respective end bearings. Thus at the outer end of each tube 32 an internal bearing shoulder can be provided for the outer race ring of the shaft bearing 33 by removing a small amount of metal interiorly of the tube end and then to stiffen and reinforce the tube at this point of load application it has sleeved thereon a collar 34 which also conveniently serves to mount the wheel brake mechanism. This collar 34 is formed at its outer end with an inwardly extending flange 35 and the collar is welded or otherwise fixed to the axle housing 32 so that the flange 35 cooperates with the end of the housing tube to provide a locating recess for an externally expandable retainer ring 36 engaging with the outer face of the outer race ring of the bearing 33 and holding the same tightly against its inner locating shoulder. The inner end of each tube 32 may similarly be formed with a shouldered abutment seat for the outer race ring of the central bearings 37 which are of the combined axial thrust and radial load type. Preferably, however, the seat forming operation at the inner end involves swaging the end so as to thicken the wall of the tube and slightly enlarge its internal diameter in forming the shouldered seat 38 for the roller bearing assembly 37.

The left-hand or shorter shaft enclosing tube 32 has its inner end additionally strengthened by having fitted in surrounding relation a centrally apertured disk or plate 39 whose central aperture is defined by a lateral flange 40 sleeved on the inner end of the tube and welded thereto. At its periphery the disk 39 is joined by means of welding to the rim of a frusto-conical shaped stiffener 41 sleeved on the tube 32 and centrally welded to the tube in outwardly spaced relation to the welded connection of the tube and plate. Similarly the inner end of the right-hand or longer length tube 32 is strengthened by a centrally apertured bulkhead plate 42 welded at its inturned flange 43 to the inner end or bearing receiving portion of the tubular arm and peripherally welded to the rim of a frusto-conical stiffener 44 which is centrally welded to the tube in outwardly spaced relation to the supporting bearing. In each instance the bulkhead plates 39 and 42 may have additional strength imparted thereto by suitable formations in the sheet metal thereof as is best illustrated in Figures 3 and 5, which show radial ribs for stiffening purposes. Figure 5 additionally illustrates the bulkhead 42 as being shaped on the forward side of the axle in a manner to provide clearance at the pinion gear with which the bulkhead is longitudinally aligned.

The bulkhead structures on the inner ends of the tube axle arms form closures for the opposite sides of the space within which is housed the differential mechanism and for completion of the end closure there is provided a central sheet metal pressed member to bridge the space between the bulkheads and which is generally in the form of a cylinder 45 coaxial with the axle assembly. A screw threaded closure plug 46 for an inspection and grease filling opening is provided in the rearward wall of the cylinder 45. On its left-hand side the cylinder terminates in an annular internal flange 47 which is apertured at circumferentially spaced points to receive fastening studs 48 which pass through peripheral portions of the plates 39 and 41 and into threaded engagement with a suitable nut and pilot ring assembly 49 interiorly of the flange 47. Along its opposite side the central cylinder 45 is permanently joined by welding or the like to a lateral flange 50 on the plate 42 and also to a marginal flange 51 on the stiffener 44. Thus a two-part axle housing assembly is provided in which all the parts are joined together by subassembly operations and the two separable subassemblies are detachably joined together by the series of bolts 48.

The line of jointure between the differential enclosing cylinder 45 and the stiffener 44 is located substantially in a vertical plane containing the axis of the pinion shaft 24 and these two pressed members moreover are formed with forwardly projecting parti-tubular portions 52 and 53 respectively, each preferably consisting of one-half of a cylinder and which have their mating edges welded together as a part of the aforesaid line of jointure to constitute a forwardly projecting or lateral third arm of the axle housing. For maximum strength these forwardly projecting portions 52 and 53 are formed with longitudinal ribbing, indicated generally at 54, and which interiorly of the housing afford open wells or axially extending passages which assist in the movement of lubricant to and from the differential housing and the supporting bearings for the pinion shaft 24. As an annularly continuous support there is fitted to the tubular portions 52—53 a cylinder 55 which terminates forwardly in an outturned annular attachment flange 56 to which a corresponding flange 57 is bolted. As shown in Figure 2 the flange 57 is a part of a torque tube enclosing the propeller shaft 25. In the absence of a torque tube type drive the flange 57 may be considered as being formed on the rim of a closure plate through which the drive shafting would project. These flanges 56 and 57 clamp between them an annular flange 58 on the pinion shaft bearing locating sleeve 59 and by the selective use of shims, such as shown at 60, the axial adjustment may be effected of the pinion gear 23 in relation to the driven ring gear 22. Openings may be provided through the nested tubular members 55 and 59 for communication with the passages afforded by the ribs 54. Additional adjustment or setting of the ring gear and pinion teeth in relation to each other is provided by controlling the position of the ring gear 22 axially of the axle housing. Thus with the ring gear 22 located to the left of the pinion 23 whereby drive thrust on the differential assembly is to the left as seen in Figure 2, there are shown a pair of shims 61 interposed between the differential side gear 16 and the thrust bearing 37 on the left-hand or thrust receiving side of the assembly. Selective use of shims 61 will, of course, control the location of the ring gear 22 and will maintain this position with the shims being so formed as to resist and transmit the thrust from the differential mechanism into the bearing. Between the differential side gear 16 and its load carrying bearing on the right-hand side of the axle there are located a pair of cooperating bowed elastic disks or Belleville springs 62, which by reason of a tendency to expand will tend not only to cooperate with the shims 61 in properly locating the parts but also will take up wear and thereby eliminate rattle due to looseness and to some extent will eliminate need for extreme accuracy in fitting of the parts. Preferably, although not necessarily, the shims 61 and the spring disk 62 can be keyed or locked against relative rotation on the side gears 16 inasmuch as freedom to rotate is unnecessary and might result in harmful wear of the parts and which wear would disturb the fit of the drive gear teeth.

I claim:

1. In a vehicle drive axle having a pair of wheel drive shafts drive coupled at their inner ends through differential mechanism with a pinion shaft, a supporting and enclosing housing of thin gauge sheet metal parts including a pair of hollow tubes arranged end to end, each with supporting bearings near opposite ends, one of the tubes being longer than the other so that its inner end is longitudinally aligned with the pinion shaft while the inner end of the other tube is spaced therefrom for reception of the differential mechanism therebetween, a pressed metal bulkhead in the form of an apertured disk centrally fitted and welded on the inner end of the shorter tube, a pressed metal frusto-conical stiffener peripherally welded to said bulkhead and centrally welded to the tube in outwardly spaced relation to the tube inner end, a pressed metal bulkhead centrally welded to the inner end of the longer tube and formed with its radial dimension reduced in the region of pinion location to afford pinion clearance, a pressed metal stiffener having a frusto-conical portion peripherally welded to the bulkhead and centrally welded to the longer tube in outwardly spaced relation to the tube inner end and having a generally half cylindrical portion projecting along the pinion shaft axis, a pressed metal central housing member having one portion of generally cylindrical shape about the drive axle axis and another portion of generally half cylindrical shape along the pinion shaft axis, said member along one edge being welded to the inner edge of the last mentioned stiffener to cooperate therewith in enclosing the longitudinal pinion shaft and the differential mechanism and said member along its opposite edge being detachably secured to the welded together bulkhead and stiffener on the shorter tube.

2. In a vehicle drive axle housing formed by a pair of separable end to end halves each comprising a number of sheet metal parts welded together as a subassembly, one of said halves including an axle shaft enclosing tube, an enlarged axially extending cylinder at the inner end of said tube and in end to end relation therewith, an attachment formation at the cylinder end remote from the tube end, a parti-tubular portion integral with the cylinder and projected laterally therefrom, a tube and cylinder joining bulkhead in the form of a centrally apertured disk centrally fitted and welded to the tube end and peripherally welded to the enlarged cylinder, a tapered stiffener centrally fitted and welded to the tube in outwardly spaced relation to the tube end and with a parti-tubular extension for cooperation with the said parti-tubular portion in edge to edge welded relation therewith, said stiffener further having its peripheral edge joined by welding to the cylinder, and the other of said halves including an axle shaft enclosing tube, a bulkhead centrally fitted and welded to the tube end and a frusto-conical stiffener centrally fitted and welded to the tube in outwardly spaced relation to tube end, with the peripheral portions of the stiffener and bulkhead welded together and arranged for detachable connection with said attachment formation on the cylinder.

3. A drive axle housing formed of sheet metal parts, including a central differential enclosing cylinder, an axle shaft enclosing tube extending outwardly on the cylinder axis, a bulkhead and a frusto-conical stiffener cooperating to join adjacent ends of the cylinder and tube, mating parti-tubular portions integral with and projected laterally from the cylinder and stiffener as a pinion shaft support, an outwardly extending axle shaft enclosing tube and a bulkhead and a frusto-conical stiffener carried on the inner end of the last mentioned tube and arranged peripherally for detachable connection with said cylinder.

4. In a drive axle housing formed from sheet metal in separable halves, a pair of coaxial axle shaft enclosing tubes, a differential enclosing cylinder coaxially and centrally disposed in relation to said tubes, a cylinder end closure permanently carried by the inner end of one of the tubes and detachably fastened to an adjacent end of the cylinder, a closure for the opposite end of the cylinder permanently joined both to the cylinder and to the inner end of the other tube as a subassembly unit with the cylinder and tube, said last mentioned closure and the cylinder having integral parti-tube formations projecting laterally therefrom and mating with one another to afford a tubular housing and support for a pinion shaft.

5. The structure of claim 4 together with a subassembly unit comprising a pinion shaft, antifriction bearings therefor and a mounting sleeve, and wherein the sleeve is nested within said tubular housing and provided in the wall thereof with a lubricant passage and wherein the tubular housing is formed with longitudinal stiffening ribbing, said ribbing being hollow to communicate the lubricant passage with the interior space of said differential enclosing cylinder.

6. The structure of claim 4 together with a tubular insert secured within the tubular housing and terminating beyond the housing in an attachment flange for connection with a mating flange of a torque tube, a pinion shaft bearing sleeve unit in which the sleeve is telescopically fitted to said insert and is provided with a locating flange for seating cooperation with the insert flange and positioning adjustment shim means for disposition between the cooperating seating flanges.

7. In combination, a pair of drive axle enclosing tubes in end to end alignment, a ring gear and differential mechanism rotatably mounted in the adjacent ends of said tubes, an enlarged cylinder surrounding said mechanism, bulkheads closing the opposite ends of the cylinder and joining the same to the said tube ends, said cylinder and one of the bulkheads having projecting portions cooperating with one another to form an angularly extending tubular housing, a pinion shaft subassembly unit including a beveled pinion gear to mesh with said ring gear and a bearing support sleeve telescopically mounted within said housing and shim means positionable between the housing and the sleeve to locate said pinion gear in proper mesh relation with the ring gear.

8. In combination, a pair of drive axle enclosing tubes arranged in end to end alignment and provided at adjacent ends with differential support bearings, differential mechanism subjected to bevel drive gearing side thrust and including a pair of oppositely disposed differential side gears, each having a shouldered bearing sleeve to be journaled in a support bearing at a tube end, a thrust opposing and locating shim device fitted between a bearing and the shouldered sleeve of the side gear on that side corresponding to the direction of drive gear thrust and a wear take up spring and locating shim device interposed between the other bearing and its associated shouldered sleeve of the side gear on that side of the ring gear which is free of drive gear thrust.

9. In combination, beveled driving and driven gears, a pair of differential side gears on opposite sides of the driven gear and in supporting and driving relation therewith, spaced apart bearings for the side gears, adjustment and thrust receiving shims between a side gear and its bearing on that side of the driven gear to which the drive thrust is directed for locating the driven gear in proper mesh engagement with its driving gear and resilient spacer means between the other side gear and its bearing.

10. In combination, a pair of axle shaft enclosing tubes arranged end to end, support bearings at adjacent ends of the tubes, differential side gears mounted in said bearings, spacer shims axially locating the gears in their respective bearings and being arranged to resist thrust between one of the gears and its bearing and to constitute a spring take-up between the other gear and its bearing and a driven ring gear interposed between and supported by said side gears and provided with beveled gear teeth on its side face remote from thrust resisting shim spacer.

11. In combination, a pair of axle shaft enclosing tubes arranged end to end, support bearings at adjacent ends of the tubes, differential side gears mounted directly in said bearings in spaced apart relation, a spider occupying the space between said gears and having oppositely projecting portions rotatably mounted by and internally of said side gears, said spider also having an annular ring gear seat peripherally thereof and said seat being provided with an outwardly opening annular groove for reception of a snap-in retainer ring, a locating shoulder forming a part of said seat and being axially spaced from said groove, a ring gear sleeved on said seat and on one side in unattached abutment with said shoulder, said ring gear having gear teeth on one portion of and a retainer ring engaging land on another portion of its side face opposite that in abutment with said shoulder, a split snap ring retainer removably fitted to said outwardly opening groove and in engagement with said land portion of the ring gear face for cooperation with said shoulder in removably retaining the ring gear on the spider and drive keying means between the ring gear and the spider.

12. In combination, a pair of axle shaft enclosing tubes arranged end to end, support bearings at adjacent ends of the tubes, differential side gears directly mounted in said bearings, a spider having trunnions rotatably supported by and internally of the side gears and also having an annular rim, said rim being formed with an outwardly projecting shoulder and an outwardly opening groove in axially spaced relation to one another, a beveled tooth ring gear fitted to said rim with its side opposite the beveled teeth seated on the shoulder, a split retainer ring fitting said groove and engaging the ring gear on the side thereof which contains the beveled teeth and locking the ring gear against the shoulder, a pin extending diametrically of the spider and terminating in key formations to interlock with mating key formations in the ring gear, and differential gears rotatably journaled on said pin in mesh with said side gears.

13. In combination, a pair of drive axle differential side gears, differential driving gears in mesh with both side gears, a support therefor having a rim portion radially outside the differential gears, said rim portion having an outwardly opening annular groove and an outwardly projecting peripheral shoulder in axially spaced relation to one another, a beveled ring gear sleeved on said rim and engaged with said shoulder, on the side opposite its gear teeth, a retainer ring engaging land internally of the teeth on the toothed side of said gear and axially spaced from the side engaged with said shoulder a distance substantially corresponding to the axial space between the shoulder and groove of the rim portion, a snap ring retainer detachably engaged with said rim to cooperate with the shoulder in holding the ring gear therebetween and means to key the ring to said rim against relative rotation.

BAIN GRIFFITH.

REFERENCES CITED

The following references are of record in the file of this patent:

UNITED STATES PATENTS

| Number | Name | Date |
|---|---|---|
| 1,076,560 | Duffy | Oct. 21, 1913 |
| 1,163,026 | Mason et al. | Dec. 7, 1915 |
| 1,557,707 | Moorhouse | Oct. 13, 1925 |
| 1,810,194 | Weaver | June 16, 1931 |
| 1,973,905 | Leach | Sept. 18, 1934 |
| 1,987,716 | Shelton | Jan. 15, 1935 |
| 2,140,190 | Riblet | Dec. 13, 1938 |
| 2,408,926 | Griffith | Oct. 8, 1946 |
| 2,478,180 | Buckendale | Sept. 9, 1949 |